(12) United States Patent
O'Neill et al.

(10) Patent No.: US 9,998,070 B2
(45) Date of Patent: *Jun. 12, 2018

(54) DURABLE SOLAR MIRROR FILMS

(71) Applicant: 3M INNOVATIVE PROPERTIES COMPANY, Saint Paul, MN (US)

(72) Inventors: Mark B. O'Neill, Stillwater, MN (US); Andrew J. Henderson, Eagan, MN (US); Timothy J. Hebrink, Scandia, MN (US); Rajesh K. Katare, Cottage Grove, MN (US); Naiyong Jing, Woodbury, MN (US); Diane North, Inver Grove Heights, MN (US); Eric M. Peterson, Saint Paul, MN (US)

(73) Assignee: 3m Innovative Properties Company, St. Paul, MN (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/391,945

(22) Filed: Dec. 28, 2016

(65) Prior Publication Data

US 2017/0111007 A1 Apr. 20, 2017

Related U.S. Application Data

(63) Continuation of application No. 14/398,485, filed as application No. PCT/US2013/037584 on Apr. 22, 2013, now Pat. No. 9,568,653.

(60) Provisional application No. 61/641,992, filed on May 3, 2012.

(51) Int. Cl.
*H02S 40/22* (2014.01)
*G02B 5/08* (2006.01)

(52) U.S. Cl.
CPC ............ *H02S 40/22* (2014.12); *G02B 5/0875* (2013.01)

(58) Field of Classification Search
CPC ... G01B 11/26; F24J 2/10; F24J 2/1047; F24J 2/12; F24J 2/541; Y02E 10/47; Y02E 10/45
See application file for complete search history.

(56) References Cited

U.S. PATENT DOCUMENTS

| | | | |
|---|---|---|---|
| 3,444,129 A | 5/1969 | Young |
| 3,460,961 A | 8/1969 | Young |
| 3,492,261 A | 1/1970 | Young |

(Continued)

FOREIGN PATENT DOCUMENTS

| | | |
|---|---|---|
| CN | 101365968 | 2/2009 |
| CN | 101423338 | 5/2009 |

(Continued)

OTHER PUBLICATIONS

International Search Report for PCT International Application No. PCT/US13/37584 dated Aug. 2, 2013, 3 pages.

(Continued)

*Primary Examiner* — Jennifer D. Carruth
(74) *Attorney, Agent, or Firm* — Eric D. Levinson

(57) ABSTRACT

The present disclosure generally relates to durable solar mirror films, methods of making durable solar mirror films, and constructions including durable solar mirror films. In one embodiment, the present disclosure relates to a solar mirror film comprising: a multilayer optical film layer including having a coefficient of hygroscopic expansion of less than about 30 ppm per percent relative humidity; and a reflective layer having a coefficient of hygroscopic expansion.

19 Claims, 2 Drawing Sheets

(56) References Cited

U.S. PATENT DOCUMENTS

| | | |
|---|---|---|
| 3,503,779 A | 3/1970 | Young |
| 3,601,471 A | 8/1971 | Seddon |
| 4,238,263 A | 12/1980 | LoMaglio |
| 4,356,053 A | 10/1982 | LoMaglio |
| 4,547,432 A | 10/1985 | Pitts |
| 4,804,565 A | 2/1989 | Rast |
| 4,963,012 A | 10/1990 | Tracy |
| 5,361,172 A | 11/1994 | Schissel |
| 5,492,750 A | 2/1996 | Shumaker, Jr. |
| 5,540,978 A | 7/1996 | Schrenk |
| 6,090,451 A | 7/2000 | Barth |
| 6,120,901 A | 9/2000 | Ojeda |
| 6,204,443 B1 | 3/2001 | Kiso |
| 6,306,507 B1 | 10/2001 | Brunelle |
| 6,368,699 B1 | 4/2002 | Gilbert |
| 6,459,514 B2 | 10/2002 | Gilbert |
| 6,544,369 B1 | 4/2003 | Kitamura |
| 6,827,886 B2 | 12/2004 | Neavin |
| 6,849,524 B2 | 2/2005 | Shelton |
| 6,878,400 B2 | 4/2005 | Colombo |
| 7,343,913 B2 | 3/2008 | Niedermeyer |
| 8,728,933 B1 | 2/2014 | Andres |
| 9,523,516 B2 | 12/2016 | Hebrink |
| 2002/0048099 A1 | 4/2002 | Lang |
| 2003/0180983 A1 | 9/2003 | Oswald |
| 2004/0253428 A1 | 12/2004 | Wang |
| 2005/0018330 A1 | 1/2005 | Sakoo |
| 2006/0181765 A1 | 8/2006 | Jorgensen |
| 2006/0227695 A1 | 10/2006 | Nagaoka |
| 2007/0048531 A1 | 3/2007 | Nagaoka |
| 2007/0214467 A1 | 9/2007 | Fukuda |
| 2008/0173390 A1 | 7/2008 | Narasimhan |
| 2008/0281023 A1 | 11/2008 | Numrich |
| 2009/0101195 A1 | 4/2009 | Reynolds |
| 2009/0146227 A1 | 6/2009 | Igarashi |
| 2009/0169879 A1 | 7/2009 | Padiyath |
| 2009/0233037 A1 | 9/2009 | Medwick |
| 2010/0186336 A1 | 7/2010 | Valente |
| 2010/0261036 A1 | 10/2010 | Calcagni |
| 2011/0023672 A1 | 2/2011 | Blanchard |
| 2011/0058209 A1 | 3/2011 | Nakano |
| 2011/0203643 A1 | 8/2011 | Watanabe |
| 2011/0226234 A1 | 9/2011 | Dros |
| 2011/0249325 A1 | 10/2011 | Zehentmaier |
| 2011/0255155 A1 | 10/2011 | Hebrink |
| 2011/0297313 A1 | 12/2011 | Samuels |
| 2011/0303277 A1 | 12/2011 | Neumann |
| 2011/0303286 A1 | 12/2011 | Kogawa |
| 2012/0107609 A1 | 5/2012 | Numrich |
| 2012/0160324 A1 | 6/2012 | Molnar |
| 2012/0190802 A1 | 7/2012 | Poe |
| 2014/0065397 A1 | 3/2014 | Johnson |

FOREIGN PATENT DOCUMENTS

| | | |
|---|---|---|
| GB | 2042761 | 9/1980 |
| JP | 2000-506084 | 5/2000 |
| JP | 2005-143943 | 6/2005 |
| JP | 2005-313586 | 11/2005 |
| JP | 2011-158751 | 8/2011 |
| WO | WO 97/32726 | 9/1997 |
| WO | WO 2000-06512 | 2/2000 |
| WO | WO 2000-61664 | 10/2000 |
| WO | WO 2003-022578 | 3/2003 |
| WO | WO 2004-114419 | 12/2004 |
| WO | WO 2007-076282 | 7/2007 |
| WO | WO 2009-070361 | 6/2009 |
| WO | WO 2009-080741 | 7/2009 |
| WO | WO 2009-140493 | 11/2009 |
| WO | WO 2009-146227 | 12/2009 |
| WO | WO 2011/012342 | 2/2011 |
| WO | WO 2011-028742 | 3/2011 |
| WO | WO 2011-062836 | 5/2011 |
| WO | WO 2012-061211 | 5/2012 |
| WO | WO 2013-019463 | 2/2013 |
| WO | WO 2013-019466 | 2/2013 |
| WO | WO 2013-019472 | 2/2013 |
| WO | WO 2013-019695 | 2/2013 |
| WO | WO 2013-019698 | 2/2013 |
| WO | WO 2013-019763 | 2/2013 |
| WO | WO 2013-115977 | 8/2013 |
| WO | WO 2013-165724 | 11/2013 |
| WO | WO 2013-165727 | 11/2013 |
| WO | WO 2013-165730 | 11/2013 |
| WO | WO 2013-165938 | 11/2013 |
| WO | WO 2013-165965 | 11/2013 |
| WO | WO 2013-166105 | 11/2013 |
| WO | WO 2014-022049 | 2/2014 |

OTHER PUBLICATIONS

Supplemental European Search Report for EP 13 78 4522 dated Nov. 11, 2015, 2 pages.
Supplemental European Search Report for EP 13 78 5228 dated Dec. 3, 2015, 2 pages.

DURABLE SOLAR MIRROR FILMS

CROSS REFERENCE TO RELATED APPLICATIONS

This application is a continuation of U.S. application Ser. No. 14/398,485, filed on Nov. 3, 2014, now pending, which is a national stage filing under 35 U.S.C. 371 of International Application No. PCT/US2013/037584, filed Apr. 22, 2013, which claims priority to U.S. Provisional Application No. 61/641,992, filed May 3, 2012. The disclosures of all three applications are incorporated herein by reference in their entirety herein.

GOVERNMENT LICENSE RIGHTS

The Government of the United States of America has rights in at least some of the inventions described in this Patent Application pursuant to DE-AC36-08GO28308 (CRADA No. 08-316) awarded by the U.S. Department of Energy.

TECHNICAL FIELD

The present disclosure generally relates to durable solar mirror films, methods of making durable solar mirror films, and constructions including durable solar mirror films.

BACKGROUND

Renewable energy is energy derived from natural resources that can be replenished, such as sunlight, wind, rain, tides, and geothermal heat. The demand for renewable energy has grown substantially with advances in technology and increases in global population. Although fossil fuels provide for the vast majority of energy consumption today, these fuels are non-renewable. The global dependence on these fossil fuels has not only raised concerns about their depletion but also environmental concerns associated with emissions that result from burning these fuels. As a result of these concerns, countries worldwide have been establishing initiatives to develop both large-scale and small-scale renewable energy resources. One of the promising energy resources today is sunlight. Globally, millions of households currently obtain power from solar photovoltaic systems.

In general, concentrated solar technology involves the collection of solar radiation in order to directly or indirectly produce electricity. The three main types of concentrated solar technology are concentrated photovoltaic, concentrated solar power, and solar thermal.

In concentrated photovoltaic (CPV), concentrated sunlight is converted directly to electricity via the photovoltaic effect. Generally, CPV technology uses optics (e.g. lenses or mirrors) to concentrate a large amount of sunlight onto a small area of a solar photovoltaic material to generate electricity. CPV systems are often much less expensive to produce than other types of photovoltaic energy generation because the concentration of solar energy permits the use of a much smaller number of the higher cost solar cells.

In concentrated solar power (CSP), concentrated sunlight is converted to heat, and then the heat is converted to electricity. Generally, CSP technology uses mirrored surfaces in multiple geometries (e.g., flat mirrors, parabolic dishes, and parabolic troughs) to concentrate sunlight onto a receiver. That, in turn, heats a working fluid (e.g. a synthetic oil or a molten salt) or drives a heat engine (e.g., steam turbine). In some cases, the working fluid is what drives the engine that produces electricity. In other cases, the working fluid is passed through a heat exchanger to produce steam, which is used to power a steam turbine to generate electricity.

Solar thermal systems collect solar radiation to heat water or to heat process streams in industrial plants. Some solar thermal designs make use of reflective mirrors to concentrate sunlight onto receivers that contain water or the feed stream. The principle of operation is very similar to concentrated solar power units, but the concentration of sunlight, and therefore the working temperatures, are not as high.

The rising demand for solar power has been accompanied by a rising demand for reflective devices and materials capable of fulfilling the requirements for these applications. Some of these solar reflector technologies include glass mirrors, aluminized mirrors, and metalized polymer films. Of these, metalized polymer films are particularly attractive because they are lightweight, offer design flexibility, and potentially enable less expensive installed system designs than conventional glass mirrors. Polymers are lightweight, inexpensive, and easy to manufacture. In order to achieve metal surface properties on a polymer, thin layers of metal (e.g. silver) are coated on the polymer surface.

One exemplary commercially available solar mirror film is shown schematically in FIG. 1. The solar mirror film 100 of FIG. 1 includes a premask layer 110, a weatherable layer 120 (including, for example, a polymer), a thin, sputter-coated tie layer 140, a reflective layer 150 (including, for example, a reflective metal such as silver), a corrosion resistant layer 160 (including, for example, a metal such as copper), an adhesive layer 170, and a liner 180. The film of FIG. 1 is typically applied to a support substrate by removing liner 180 and placing adhesive layer 170 adjacent to the support substrate. Premask layer 110 is then removed to expose weatherable layer 120 to sunlight.

SUMMARY

The metalized polymer films used in concentrated solar power units and concentrated photovoltaic cells are subject to continuous exposure to the elements. Consequently, a technical challenge in designing and manufacturing metalized polymer reflective films is achieving long-term (e.g., 20 years) durability when subjected to harsh environmental conditions. There is a need for metalized polymer films that provide durability and retained optical performance (e.g., reflectivity) once installed in a concentrated solar power unit or a concentrated photovoltaic cell. Mechanical properties, optical clarity, corrosion resistance, ultraviolet light stability, and resistance to outdoor weather conditions are all factors that can contribute to the gradual degradation of materials over an extended period of operation.

The inventors of the present disclosure recognized that many of the technical problems in forming a durable metalized polymer film capable of long-term outdoor use that retains its optical performance arise from the fundamental mismatch in the physical and chemical nature and properties of metals and polymers. One particular difficulty relates to ensuring good adhesion between the polymer layer and the metal reflective surface. Without good adhesion between these surfaces/layers, delamination occurs. Delamination between the polymer layer and the reflective layer is often referred to as "tunneling."

The inventors of the present disclosure recognized that the delamination typically results from decreased adhesion between the polymer layer and the reflective layer. This decreased adhesion can be caused by any of numerous factors—and often a combination of these factors. Some exemplary factors that the inventors of the present disclosure recognized include (1) increased mechanical stress between the polymer layer and the reflective layer; (2) oxidation of the reflective layer; (3) oxidation of an adhesive adjacent to the reflective layer; and (4) degradation of the polymer layer (this can be due to, for example, exposure to sunlight). Each of these factors can be affected by numerous external conditions, such as, for example, environmental temperature (including variations in environmental temperatures), thermal shock, humidity, exposure to moisture, exposure to air impurities such as, for example, salt and sulfur, UV exposure, product handling, and product storage.

One of the most challenging problems is related to stress at the metal/polymer interface. Once the stress becomes too great, buckling can occur, causing the polymer layer to delaminate from the metal reflective layer. Further, when metalized polymer films are cut, their edges may be fractured and unprotected. Corrosion of metalized polymers typically begins at their edges. So, the combination of fractured, exposed metal edges with the net interfacial stresses listed above can overcome adhesion strength and cause tunneling. The inventors of the present invention recognized the importance of protecting the interface between the polymer layer and the metal reflective layer—especially along the edges.

Two prior art approaches have been used to address these problems. First, a sealing caulk has been applied around the edges of the solar mirror metalized film. Second, a tape has been wrapped around the edges of the solar mirror metalized film. Both approaches are effective at minimizing short-term delamination and/or tunneling, if properly applied. However, both approaches disadvantageously reduce the total available reflective area. Also, both approaches disadvantageously introduce a separate material to the front surface of the metalized film, which results in the creation of a ridge or protrusion above and below the plane of the metalized film. These ridges or protrusions are areas of potential additional stress when the metalized film is exposed to, for example, wind and hail. The additional stress is increased during routine maintenance processes including, for example, cleaning (e.g. pressure washing) and handling during application. Also, in order to be effective over the lifetime of the metalized film (e.g., 20 years), the separate material must adhere to the metalized film for the lifetime of the film. These materials have limited ability to do so. Consequently, neither prior art approach provided an effective, long-term solution to the problems described herein.

The inventors of the present application recognized that polymeric weatherable layers (e.g., acrylic) have a coefficient of hygroscopic expansion (CHE) on the order of about 30 parts per million (ppm) per percent relative humidity (RH) while the metal reflective layer has a CHE of about zero ppm per RH. The inventors of the present disclosure recognized that one way to minimize or eliminate film delamination and/or tunneling involves including in the mirror film construction a multilayer optical film as the weatherable layer. The multilayer optical film has a CHE that is between the CHE of the prior art weatherable layer and the CHE of the reflective layer. As such, use of the multilayer optical film as the weatherable layer lowers the stress differential caused by the disparity in CHEs of the prior art weatherable layer and the metal reflective layer. Elimination or minimization of this stress differential eliminates or minimizes tunneling and/or delamination and results in solar mirror films having an increased life. Increased life results in decreased cost of solar power generation, which may lead to faster and/or wider adoption of this valuable form of green energy generation.

One embodiment of the present disclosure relates to a solar mirror film comprising: a multilayer optical film layer having a coefficient of hygroscopic expansion of less than about 30 ppm per percent relative humidity; and a reflective layer.

Some embodiments of the solar mirror film include a multilayer optical film having a CHE that is between about 25 ppm per percent RH and about 5 ppm per percent RH. In some embodiments of the solar mirror film, the CHE of the multilayer optical film layer is between about 10 ppm per percent RH and about 25 ppm per percent RH. In some embodiments of the solar mirror film, the CHE of the multilayer optical film layer is between about 15 ppm per percent RH and about 20 ppm per percent RH.

Some embodiments of the solar mirror film have a metal layer as the reflective layer. Some embodiments of the solar mirror film include a reflective layer that is at least one of silver, gold, aluminum, copper, nickel, and titanium. Some embodiments of the solar mirror film include a reflective layer whose CHE is between 0 ppm per percent RH and 3 ppm per percent RH. Some embodiments of the solar mirror film further include a tie layer between the multilayer optical film layer and the reflective layer. In some embodiments, the tie layer includes titanium dioxide.

In some embodiments of the solar mirror film, the multilayer optical film layer is a weatherable layer. Some embodiments of the solar mirror film include a weatherable layer. Some embodiments of the solar mirror film include a compliance layer between the multilayer optical film layer and the reflective layer. In some embodiments, the compliance layer comprises butyl acrylate. Some embodiments of the solar mirror film include a corrosion protective layer adjacent to the reflective layer. In some embodiments, the corrosion protective layer comprises at least one of copper and an inert metal alloy.

Some embodiments of the solar mirror film include an adhesive layer adjacent to the reflective layer. In some embodiments, the adhesive is a pressure sensitive adhesive. In some embodiments, the adhesive layer is between the reflective layer and a substrate Another embodiment of the present disclosure relates to a concentrated photovoltaic system including a solar mirror film as described herein, including, but not limited to, any of the embodiments described above.

Another embodiment of the present disclosure relates to a concentrated solar power system including a solar mirror film as described herein, including, but not limited to, any of the embodiments described above.

Another embodiment of the present disclosure relates to a reflector assembly including a solar mirror film as described herein, including, but not limited to, any of the embodiments described above.

Various aspects and advantages of exemplary embodiments of the disclosure have been summarized. The above summary is not intended to describe each illustrated embodiment or every implementation of the present disclosure. The Drawings and the Detailed Description that follow more particularly exemplify the various embodiments disclosed herein. These and various other features and advantages will be apparent from a reading of the following detailed description.

DETAILED DESCRIPTION

Some embodiments of the present application relate to the inclusion of a multilayer optical film as the weatherable layer of a solar mirror film. The multilayer optical film (MOF) has a CHE that is between the CHE of typically used weatherable layers (e.g., acrylics) and the CHE of the reflective layer. As such, the multilayer optical film lowers the stress differential caused by the disparity in CHEs of the weatherable layer and the reflective layer.

Figure 1:
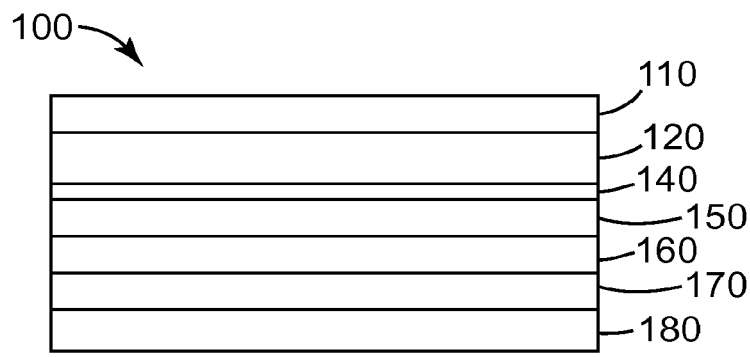
FIG. 1 is a schematic view of a prior art solar mirror film.
Figure 2:
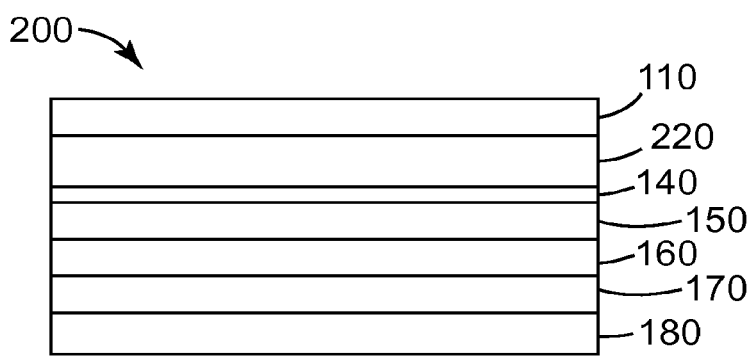
FIG. 2 is a schematic view of one exemplary embodiment of a solar mirror film in accordance with the present disclosure.

One exemplary embodiment is shown schematically in FIG. 2. Solar mirror film 200 of FIG. 2 includes a premask layer 110, a MOF weatherable layer 220, a thin, sputter-coated tie layer 140, a reflective layer 150 (including, for example, a reflective metal such as silver), a corrosion resistant layer 160 (including, for example, a metal such as copper), an adhesive layer 170, and a liner 180.

Figure 3:
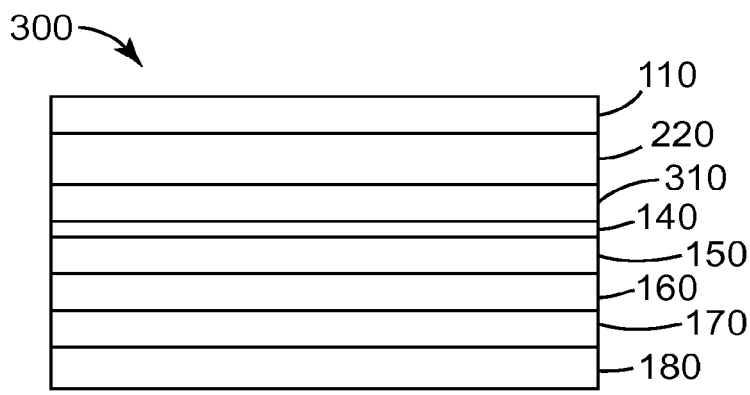
FIG. 3 is a schematic view of another exemplary embodiment of a solar mirror film in accordance with the present disclosure.

Another exemplary embodiment is shown schematically in FIG. 3. Solar mirror film 300 includes a premask layer 110, a MOF weatherable layer 220, a compliance layer 310 (including, for example, an butyl acrylate), a thin, sputter-coated tie layer 140, a reflective layer 150 (including, for example, a reflective metal such as silver), a corrosion resistant layer 160 (including, for example, a metal such as copper), an adhesive layer 170, and a liner 180.

Figure 4:
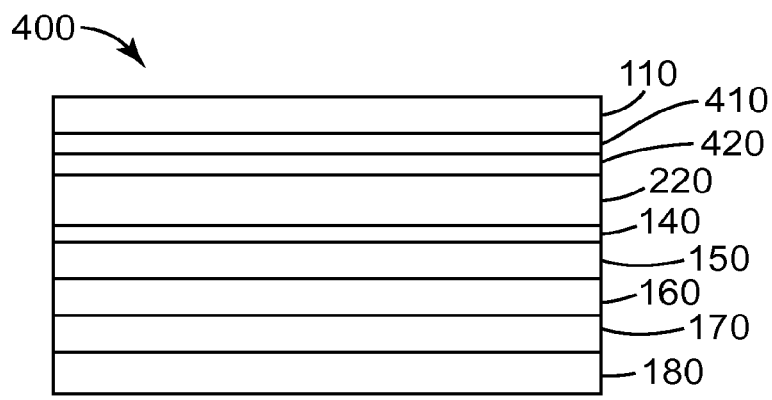
FIG. 4 is a schematic view of another exemplary embodiment of a solar mirror film in accordance with the present disclosure.

Another exemplary embodiment is shown schematically in FIG. 4. Solar mirror film 400 includes a premask layer 110, a PMMA layer 410, an adhesive layer 420, a MOF weatherable layer 220, a thin, sputter-coated tie layer 140, a reflective layer 150 (including, for example, a reflective metal such as silver), a corrosion resistant layer 160 (including, for example, a metal such as copper), an adhesive layer 170, and a liner 180. Some implementations of this embodiment also include a compliance layer, as shown schematically in FIG. 3 and described below.

Figure 5:
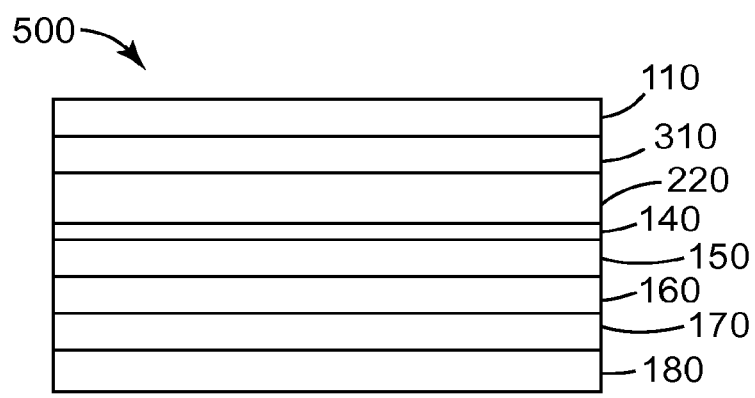
FIG. 5 is a schematic view of another exemplary embodiment of a solar mirror film in accordance with the present disclosure.

Another exemplary embodiment is shown schematically in FIG. 5. Solar mirror film 500 includes a premask layer 110, a compliance layer 310, a MOF weatherable layer 220, a thin, sputter-coated tie layer 140, a reflective layer 150 (including, for example, a reflective metal such as silver), a corrosion resistant layer 160 (including, for example, a metal such as copper), an adhesive layer 170, and a liner 180.

For purposes of clarity, all layers in the various embodiments shown in FIGS. 1-5 and described herein are optional except for the MOF layer and the reflective layer. Each layer that could be included in a solar mirror film of the types generally described herein is discussed in detail below.

Premask Layer

The premask layer is optional. Where present, the premask protects the weatherable layer during handling, lamination, and installation. Such a configuration can then be conveniently packaged for transport, storage, and consumer use. In some embodiments, the premask is opaque to protect operators during outdoor installations. In some embodiments, the premask is transparent to allow for inspection for defects. Any known premask can be used. One exemplary commercially available premask is ForceField® 1035 sold by Tredegar of Richmond, Va.

Multilayer Optical Film Layer

Exemplary multilayer optical films of the present disclosure may be prepared, for example, using the apparatus and methods disclosed in U.S. Pat. No. 6,783,349, entitled "Apparatus for Making Multilayer Optical Films," U.S. Pat. No. 6,827,886, entitled "Method for Making Multilayer Optical Films," and PCT Publication Nos. WO 2009/140493 entitled "Solar Concentrating Mirror" and WO 2011/062836 entitled "Multi-layer Optical Films," all of which are incorporated herein by reference in their entireties. In WO 2009/140493, PMMA/PVDF skin layers are described. Examples of additional layers or coatings suitable for use with exemplary multilayer optical films of the present disclosure are described, for example, in U.S. Pat. Nos. 6,368,699, and 6,459,514 both entitled "Multilayer Polymer Film with Additional Coatings or Layers," both of which are incorporated herein by reference in their entireties.

In some embodiments, the weatherable MOF layer may have spectral regions of high reflectivity (>90%) and other spectral regions of high transmissivity (>90%). In some embodiments, the weatherable layer provides high optical transmissivity over a portion of the solar spectrum and low haze and yellowing, good weatherability, good abrasion, scratch, and crack resistance during to handling and cleaning, and good adhesion to other layers, for example, other (co)polymer layers, metal oxide layers, and metal layers applied to one or both major surfaces of the films when used as substrates, for example, in compact electronic display and/or solar energy applications.

Inclusion of the multilayer optical film in the solar mirror film construction can, in some embodiments, be introduced as in-line processes.

Inclusion of the multilayer optical film in the solar mirror film confers various advantages. The multilayer optical film has a coefficient of hygroscopic expansion that is between the coefficient of hygroscopic expansion of prior art weatherable layers and the reflective layer. In some embodiments, the multilayer optical film has a coefficient of hygroscopic expansion that is less than 30 ppm per percent RH. In some embodiments, the multilayer optical film has a coefficient of hygroscopic expansion of between about 10 ppm per percent relative humidity and about 25 ppm per percent relative humidity. In some embodiments, the multilayer optical film has a coefficient of hygroscopic expansion of between about 15 ppm per percent relative humidity and about 20 ppm per percent relative humidity.

Prior art weatherable films have a coefficient of hygroscopic expansion of at least about 30 ppm per percent RH. In some embodiments, the coefficient of hygroscopic expansion of the multilayer optical film is between about 75% and about 25% of the coefficient of hygroscopic expansion of the prior art weatherable layers. In some embodiments, the coefficient of hygroscopic expansion of the multilayer optical film is between about 70% and about 30% of the coefficient of hygroscopic expansion of the prior art weatherable layers. In some embodiments, the coefficient of hygroscopic expansion of the multilayer optical film is between about 60% and about 40% of the coefficient of hygroscopic expansion of the prior art weatherable layers.

Tie Layer

In some embodiments, the tie layer includes a metal oxide such as aluminum oxide, copper oxide, titanium dioxide, silicon dioxide, or combinations thereof. As a tie layer, titanium dioxide was found to provide surprisingly high resistance to delamination in dry peel and wet peel testing. Further options and advantages of metal oxide tie layers are described in U.S. Pat. No. 5,361,172 (Schissel et al.), incorporated by reference herein.

In any of the foregoing exemplary embodiments, the tie layer has a thickness of equal to or less than 500 micrometers. In some embodiments, the tie layer has a thickness of between about 0.1 micrometer and about 5 micrometers. In some embodiments, it is preferable that the tic layer have an overall thickness of at least 0.1 nanometers, at least 0.25 nanometers, at least 0.5 nanometers, or at least 1 nanometer. In some embodiments, it is preferable that the tie layer have an overall thickness no greater than 2 nanometers, no greater than 5 nanometers, no greater than 7 nanometers, or no greater than 10 nanometers.

Compliance Layer

In some embodiments, the solar mirror film includes a compliance layer. Compliance layers are preferably non-tacky at ambient temperatures. In some embodiments, the compliance layer includes poly(methyl methacrylate) and a first block copolymer having at least two endblock polymeric units that are each derived from a first monoethylenically unsaturated monomer comprising a methacrylate, acrylate, styrene, or combination thereof, wherein each endblock has a glass transition temperature of at least 50 degrees Celsius; and at least one midblock polymeric unit that is derived from a second monoethylenically unsaturated monomer comprising a methacrylate, acrylate, vinyl ester, or combination thereof, wherein each midblock has a glass transition temperature no greater than 20 degrees Celsius.

Alternatively, in some embodiments, the compliance layer includes a block copolymer/homopolymer blend. For example, the compliance layer may include an A-B-A triblock copolymer blended with a homopolymer that is soluble in either the A or B block. Optionally, the homopolymer has a polymeric unit identical to either the A or B block. The addition of one or more homopolymers to the block copolymer composition can be advantageously used either to plasticize or to harden one or both blocks. In preferred embodiments, the block copolymer contains a poly(methyl methacrylate) A block and a poly(butyl acrylate) B block, and is blended with a poly(methyl methacrylate) homopolymer.

Advantageously, blending poly(methyl methacrylate) homopolymer with poly(methyl methacrylate)-poly(butyl acrylate) block copolymers allows the hardness to be tailored to the desired application. As a further advantage, blending with poly(methyl methacrylate) provides this control over hardness without significantly degrading the clarity or processibility of the overall composition. Preferably, the homopolymer/block copolymer blend has an overall poly (methyl methacrylate) composition of at least 30 percent, at least 40 percent, or at least 50 percent, based on the overall weight of the blend. Preferably, the homopolymer/block copolymer blend has an overall poly(methyl methacrylate) composition no greater than 95 percent, no greater than 90 percent, or no greater than 80 percent, based on the overall weight of the blend.

Particularly suitable non-tacky block copolymers include poly(methyl methacrylate)-poly(n-butyl acrylate)-poly (methyl methacrylate) (25:50:25) triblock copolymers. These materials were previously available under the trade designation LA POLYMER from Kuraray Co., LTD.

Optionally, the block copolymer may be combined with a suitable ultraviolet light absorber to enhance the stability. In some embodiments, the block copolymer contains an ultraviolet light absorber. In some embodiments, the block copolymer contains an amount of the ultraviolet light absorber ranging from 0.5 percent to 3.0 percent by weight, based on the total weight of the block copolymer and absorber. It is to be noted, however, that the block copolymer need not contain any ultraviolet light absorbers. Using a composition free of any ultraviolet light absorbers can be advantageous because these absorbers can segregate to the surfaces and interfere with adhesion to adjacent layers.

In some embodiments, the block copolymer may be combined with one or more nanofillers to adjust the modulus of the compliance layer. For example, a nanofiller such as silicon dioxide or zirconium dioxide can be uniformly dispersed in the block copolymer to increase the overall stiffness or hardness of the solar mirror film. In preferred embodiments, the nanofiller is surface-modified as to be compatible with the polymer matrix.

In some embodiments, the compliance layer includes a random copolymer having a first polymeric unit with a relatively high $T_g$ and second polymeric unit with a relatively low $T_g$. In this embodiment, the first polymeric unit derives from a first monoethylenically unsaturated monomer comprising a methacrylate, acrylate, styrene, or combination thereof and associated with a glass transition temperature of at least 50 degrees Celsius and the second polymeric unit derived from a second monoethylenically unsaturated monomer comprising a methacrylate, acrylate, vinyl ester, or combination thereof and associated with a glass transition temperature no greater than 20 degrees Celsius. In some preferred random copolymers, the first polymeric unit is methyl methacrylate and the second polymeric unit is butyl acrylate. It is preferable that the random copolymer has a methyl methacrylate composition of at least 50 percent, at least 60 percent, at least 70 percent, or at least 80 percent, based on the overall weight of the random copolymer. It is further preferable that the random copolymer has a methyl methacrylate composition of at most 80 percent, at most 85 percent, at most 90 percent, or at most 95 percent, based on the overall weight of the random copolymer.

In some embodiments, the compliance layer has a thickness of at least 10 micrometers, at least 50 micrometers, or at least 60 micrometers. Additionally, in some embodiments, the compliance layer has a thickness no greater than 200 micrometers, no greater than 150 micrometers or no greater than 100 micrometers. In some embodiments, the compliance layer has a thickness no greater than 5 micrometers. In some such embodiments, the compliance layer has a thickness of from 0.1 micrometer to 3 micrometers.

Reflective Layer

The solar mirror films described herein include one or more reflective layers. Besides providing a high degree of reflectivity, the reflective layer(s) can provide manufacturing flexibility. Optionally, the reflective layer may be applied onto a relatively thin organic tic layer or inorganic tic layer, which is in turn situated on a weatherable layer.

In some embodiments, the reflective layer(s) have smooth, reflective metal surfaces that are specular. As used herein, the term "specular surfaces" refer to surfaces that induce a mirror-like reflection of light in which the direction of incoming light and the direction of outgoing light form the same angle with respect to the surface normal. Any reflective metal may be used for this purpose, although preferred metals include silver, gold, aluminum, copper, nickel, and titanium. In some embodiments, the reflective layer includes elemental silver.

The reflective layer has a coefficient of hygroscopic expansion of about zero ppm per percent RH. In some embodiments, the reflective layer has a coefficient of hygroscopic expansion of between about zero ppm per percent RH and about 3 ppm per percent RH.

The reflective layer need not extend across the entire major surface of the weatherable layer. If desired, the weatherable layer can be masked during the deposition process such that the reflective layer is applied onto only a pre-determined portion of the weatherable layer.

Patterned deposition of the reflective layer onto the multilayer optical film or weatherable layer is also possible. Exemplary ways of creating a pattern in the reflective layer are described, for example, in matter numbers 69678US002, 69677US002, and 69681US002, all assigned to the present applicant and all incorporated herein in their entirety.

Application of the metal to the polymer can be achieved using numerous coating methods including, for example, physical vapor deposition via sputter coating, evaporation via e-beam or thermal methods, ion-assisted e-beam evaporation, electro-plating, spray painting, vacuum deposition, and combinations thereof. The metallization process is chosen based on the polymer and metal used, the cost, and many other technical and practical factors.

Physical vapor deposition (PVD) of metals is very popular for some applications because it provides the purest metal on a clean interface. In this technique, atoms of the target are ejected by high-energy particle bombardment so that they can impinge onto a substrate to form a thin film. The high-energy particles used in sputter-deposition are generated by a glow discharge, or a self-sustaining plasma created by applying, for example, an electromagnetic field to argon gas.

In one exemplary method, the deposition process continues for a sufficient duration to build up a suitable layer thickness of the reflective layer on the weatherable layer, thereby forming the reflective layer.

The reflective layer is preferably thick enough to reflect the desired amount of the solar spectrum of light. The preferred thickness can vary depending on the composition of the reflective layer. In some exemplary embodiments, the reflective layer is between about 75 nanometers to about 100 nanometers thick for metals such as silver, aluminum, copper, and gold. Although not shown in the figures, two or more reflective layers may be used.

In some embodiments, the reflective layer has a thickness no greater than 500 nanometers. In some embodiments, the reflective layer has a thickness of from 80 nm to 250 nm. In some embodiments, the reflective layer has a thickness of at least 25 nanometers, at least 50 nanometers, at least 75 nanometers, at least 90 nanometers, or at least 100 nanometers. Additionally, in some embodiments, the reflective layer has a thickness no greater than 100 nanometers, no greater than 110 nanometers, no greater than 125 nanometers, no greater than 150 nanometers, no greater than 200 nanometers, no greater than 300 nanometers, no greater than 400 nanometers, or no greater than 500 nanometers.

Corrosion Resistant Layer

The corrosion resistant layer is optional. Where included, the corrosion resistant layer may include, for example, elemental copper. Use of a copper layer that acts as a sacrificial anode can provide a reflective article with enhanced corrosion-resistance and outdoor weatherability. As another approach, a relatively inert metal alloy such as Inconel (an iron-nickel alloy) can also be used.

The corrosion resistant layer is preferably thick enough to provide the desired amount of corrosion resistance. The preferred thickness can vary depending on the composition of the corrosion resistant layer. In some exemplary embodiments, the corrosion resistant layer is between about 75 nanometers to about 100 nanometers thick. In other embodiments, the corrosion resistant layer is between about 20 nanometers and about 30 nanometers thick. Although not shown in the figures, two or more corrosion resistant layers may be used.

In some embodiments, the corrosion resistant layer has a thickness no greater than 500 nanometers. In some embodiments, the corrosion resistant layer has a thickness of from 80 nm to 250 nm. In some embodiments, the corrosion resistant layer has a thickness of at least 25 nanometers, at least 50 nanometers, at least 75 nanometers, at least 90 nanometers, or at least 100 nanometers. Additionally, in some embodiments, the corrosion resistant layer has a thickness no greater than 100 nanometers, no greater than 110 nanometers, no greater than 125 nanometers, no greater than 150 nanometers, no greater than 200 nanometers, no greater than 300 nanometers, no greater than 400 nanometers, or no greater than 500 nanometers.

Adhesive Layer

The adhesive layer is optional. Where present, the adhesive layer adheres the multilayer construction to a substrate (not shown in the figures). In some embodiments, the adhesive is a pressure sensitive adhesive. As used herein, the term "pressure sensitive adhesive" refers to an adhesive that exhibits aggressive and persistent tack, adhesion to a substrate with no more than finger pressure, and sufficient cohesive strength to be removable from the substrate. Exemplary pressure sensitive adhesives include those described in PCT Publication No. WO 2009/146227 (Joseph, et al.), incorporated herein by reference.

Liner

The liner is optional. Where present, the liner protects the adhesive and allows the solar mirror film to be transferred onto and another substrate. Such a configuration can then be conveniently packaged for transport, storage, and consumer use. In some embodiments, the liner is a release liner. In some embodiments, the liner is a silicone-coated release liner.

Substrate

The films described herein can be applied to a substrate by removing liner 180 (where present) and placing adhesive layer 170 (where present) adjacent to the substrate. Premask layer 110 (where present) is then removed to expose weatherable layer 120 to sunlight. Suitable substrates generally share certain characteristics. Most importantly, the substrate should be sufficiently rigid. Second, the substrate should be sufficiently smooth that texture in the substrate is not transmitted through the adhesive/metal/polymer stack. This, in turn, is advantageous because it: (1) allows for an optically accurate mirror, (2) maintains physical integrity of the metal reflective layer by eliminating channels for ingress of reactive species that might corrode the metal reflective layer or degrade the adhesive, and (3) provides controlled and defined stress concentrations within the reflective film-substrate stack. Third, the substrate is preferably nonreactive with the reflective mirror stack to prevent corrosion. Fourth, the substrate preferably has a surface to which the adhesive durably adheres.

Exemplary substrates for reflective films, along with associated options and advantages, are described in PCT Publication Nos. WO04114419 (Schripsema), and WO03022578 (Johnston et al.); U.S. Publication Nos. 2010/0186336 (Valente, et al.) and 2009/0101195 (Reynolds, et al.); and U.S. Pat. No. 7,343,913 (Neidermeyer). For example, the article can be comprised in one of the many mirror panel assemblies as described in co-pending and co-owned provisional U.S. patent application Ser. No. 13/393,879 (Cosgrove, et al.). Other exemplary substrates include metals, such as, for example, aluminum, steel, glass, or composite materials.

Those of skill in the art will appreciate that the embodiments described herein can include additional materials or layers. For example, some embodiments may include a compliant layer as is described in U.S. Patent Application Matter No. 69682US002, assigned to the present assignee and incorporated herein by reference in its entirety. Some embodiments may have less or no silver on the edge regions of the solar mirror film, as is described in U.S. Patent Application Matter No. 69678US002, assigned to the assignee of the present disclosure and incorporated herein by reference in its entirety.

Advantages and embodiments of this disclosure are further illustrated by the following examples, but the particular materials and amounts thereof recited in these examples, as well as other conditions and details, should not be construed to unduly limit this disclosure. These examples are merely for illustrative purposes and are not meant to be limiting on the scope of the appended claims. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques. Also, in these examples, all percentages, proportions and ratios are by weight unless otherwise indicated.

EXAMPLES

Test Methods:
Coefficient of Hygroscopic Expansion (CHE):
Hygroscopic expansion was measured using a dynamic mechanical analyzer (DMA) (model "Q800" obtained from TA Instruments) coupled with a DMA-RH accessory (obtained from TA Instruments). Displacement (in m/m) was measured over a ramp of varying relative humidities, ranging from about 20% to about 80% at a constant temperature of 25° C. Changes in the sample dimensions caused by humidity changes are used to calculate the CHE. Results are expressed in parts per million (ppm) per percent relative humidity (% RH).
Neutral Salt Spray Test (NSS)
Corrosion of the comparative and examples was evaluated following the procedure outlined on ISO 9227:2006, "Corrosion tests in artificial atmospheres—Salt spray tests" with the exception that results are reported as visual observations after various times.

Comparative Example

A silver metallized acrylic film ("ECP-305+" manufactured by 3M Company, St. Paul, Minn.) was provided. This film looked substantially the same as the film shown in FIG. 1 except that it did not include tie layer 140. The silver metallized acrylic film had a CHE of 30 ppm per percent RH. The ECP-305+ film was laminated to a painted aluminum substrate using the PSA included in the product. The sample was cut to 4"×4" using a shear cutter. The sample was weather tested according to the NSS described above and was found to exhibit tunneling in less than 72 hours.

Example 1

A multilayer optical film was prepared as following: a multilayer optical stack (described below) was prepared by coextruding first and second polymer layers through a multilayer polymer melt manifold to create a multilayer melt stream having five-hundred and fifty alternating layers. Two skin layers each having a thickness of approximately 4 microns were also co-extruded as protective layers on each side of the optical layer stack. The multilayer melt stream was cast onto a chilled roll creating a multilayer cast web. The multilayer cast web was then heated in a tenter oven to a temperature of about 105° C. prior to being biaxially oriented to a draw ratio of 3.8 by 3.8. A silver reflective layer approximately 100 nm thick was vapor deposited onto the film substrate. A copper layer approximately 80 nm thick was coated onto the silver layer. A 25 micron acrylic adhesive was coated onto the copper layer. The resulting multilayer optical film was bonded to an epoxy coated aluminum substrate having a thickness of about 0.5 mm. The laminated sample was cut to 4"×4" using a shear cutter.

The first polymer layer of the multilayer stack was a birefringent layer including polyethylene terephtalate (PET) (obtained under the trade designation "PET 9921," sold by Eastman Chemical Company), and an ultraviolet absorber (obtained under the trade designation "SUKANO UV MASTERBATCH TA07-07," sold by Sukano Polymers Corporation, Duncan, S.C.) compounded at about 10 weight percent (wt %). The second polymer layer included a copolymer of polymethyl(meth)acrylate (co-PMMA) (obtained under the trade designation "ATOGLAS 510A," sold by Arkema, King of Prussia, Pa.). The skin layers included a polymer blend comprising 35% polyvinylidene fluoride (PVDF) (obtained under the trade designation "DYNEON PVDF 6008," sold by 3M Company) and 65% polymethyl (meth)acrylate (PMMA) (obtained under the trade designation "CP-82," sold by Plaskolite, Columbus, Ohio), and which included 2.5 wt % of a second ultraviolet absorber The hygroscopic expansion of the multilayer MOF film was measured as described above and determined to be about 15 ppm per percent RH.

The laminated film sample was weather tested as described above and was found not to exhibit tunneling after 1500 hours.

Example 2

A multilayer optical film was prepared as following: a multilayer optical stack (described below) was prepared by coextruding first and second polymer layers through a multilayer polymer melt manifold to create a multilayer melt stream having one hundred and fifty alternating layers. Two skin layers each having a thickness of approximately 4 microns were also co-extruded as protective layers on each side of the optical layer stack. The multilayer melt stream was cast onto a chilled roll creating a multilayer cast web. The multilayer cast web was then heated in a tenter oven to a temperature of about 105° C. prior to being biaxially oriented to a draw ratio of 3.8 by 3.8. A silver reflective layer approximately 100 nm thick can be vapor deposited onto the film substrate. A copper layer approximately 80 nm thick can be coated onto the silver layer. A 25 micron acrylic adhesive can be coated onto the copper layer. The resulting multilayer optical film can be bonded to an epoxy coated aluminum substrate having a thickness of about 0.5 mm.

The first polymer layer of the multilayer stack was a non-birefringent layer including a polymer blend comprising 80 wt % polymethyl(meth)acrylate (PMMA) (obtained under the trade designation "CP-82," sold by Plaskolite, Columbus, Ohio) and 20 wt % polyvinylidene fluoride (PVDF) (obtained under the trade designation "DYNEON PVDF 6008," sold by 3M Company). The second polymer layer included a polymer blend comprising 20 wt % polymethyl(meth)acrylate (PMMA) (obtained under the trade designation "CP-82," sold by Plaskolite, Columbus, Ohio) and 80 wt % polyvinylidene fluoride (PVDF) (obtained under the trade designation "DYNEON PVDF 6008," sold by 3M Company). The skin layers included a polymer blend comprising polyvinylidene fluoride (PVDF) (obtained under the trade designation "DYNEON PVDF 6008," sold by 3M Company) and polymethyl(meth)acrylate (PMMA) (obtained under the trade designation "CP-82," sold by Plaskolite, Columbus, Ohio), and further including 10 wt % of a second ultraviolet absorber (obtained under the trade designation "SUKANO UV MASTERBATCH TA11-10 MB03," sold by Sukano Polymers Corporation).

The hygroscopic expansion of the multilayer MOF film measured as described above is expected to be about 15 ppm per percent RH. The film weather tested as described above is not expected to exhibit tunneling after 1500 hours.

All references mentioned herein are incorporated by reference.

Unless otherwise indicated, all numbers expressing feature sizes, amounts, and physical properties used in the present disclosure and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this disclosure and the appended claims, the term "or" is generally employed in its sense including "and/or" unless the content clearly dictates otherwise.

Various embodiments and implementation of the present disclosure are disclosed. The disclosed embodiments are presented for purposes of illustration and not limitation. The implementations described above and other implementations are within the scope of the following claims. One skilled in the art will appreciate that the present disclosure can be practiced with embodiments and implementations other than those disclosed. Those having skill in the art will appreciate that many changes may be made to the details of the above-described embodiments and implementations without departing from the underlying principles thereof. It should be understood that this invention is not intended to be unduly limited by the illustrative embodiments and examples set forth herein and that such examples and embodiments are presented by way of example only with the scope of the invention intended to be limited only by the claims set forth herein as follows. Further, various modifications and alterations of the present invention will become apparent to those skilled in the art without departing from the spirit and scope of the present disclosure. The scope of the present application should, therefore, be determined only by the following claims.

What is claimed is:

1. A solar mirror film comprising:
   a multilayer optical film layer including having a coefficient of hygroscopic expansion of less than about 30 ppm per percent relative humidity;
   a reflective layer, and
   a tie layer between the multilayer optical film layer and the reflective layer,
   wherein the reflective layer is a metal layer, and
   wherein the tie layer comprises titanium dioxide.

2. The solar mirror film of claim 1, wherein the coefficient of hygroscopic expansion of the multilayer optical film layer is between about 25 ppm per percent relative humidity and about 5 ppm per percent relative humidity.

3. The solar mirror film of claim 1, wherein the reflective layer comprises at least one of silver, gold, aluminum, copper, nickel, and titanium.

4. The solar mirror film of claim 1, wherein the reflective layer has a coefficient of hygroscopic expansion that is between 0 ppm per percent relative humidity and 3 ppm per percent relative humidity.

5. The solar mirror film of claim 1, further comprising: a weatherable layer adjacent to the multilayer optical film layer.

6. The solar mirror film of claim 1, wherein the multilayer optical film layer exhibits an average radiation reflectivity of at least 90% over a portion of the solar radiation wavelength range from 380 nm to 3,000 nm.

7. The solar mirror film of claim 1, wherein the coefficient of hygroscopic expansion of the multilayer optical film layer is between about 10 ppm per percent relative humidity and about 25 ppm per percent relative humidity.

8. The solar mirror film of claim 1, wherein the coefficient of hygroscopic expansion of the multilayer optical film layer is between about 15 ppm per percent relative humidity and about 20 ppm per percent relative humidity.

9. The solar mirror film of claim 1, further comprising: a compliance layer between the multilayer optical film layer and the reflective layer.

10. The solar mirror film of claim 9, wherein the compliance layer comprises butyl acrylate.

11. The solar mirror film of claim 1, further comprising: a corrosion protective layer adjacent to the reflective layer.

12. The solar mirror film of claim 11, wherein the corrosion protective layer comprises at least one of copper and an inert metal alloy.

13. The solar mirror film of claim 1, further including an adhesive layer adjacent to the reflective layer.

14. The solar mirror film of claim 13, wherein the adhesive layer is between the reflective layer and a substrate.

15. The solar mirror film of claim 1, further comprising: a substrate.

16. The solar mirror film of claim 1, wherein the solar mirror film is incorporated into a reflector assembly.

17. The solar mirror film of claim 1, wherein the solar mirror film includes one or more skin layers including PMMA and PVDF.

18. The solar mirror film of claim 1 claim 1, wherein the solar mirror film includes one or more optical layers including a blend of PMMA and PVDF.

19. A concentrated photovoltaic system, comprising the solar mirror film of claim 1.

* * * * *